Figure 1:
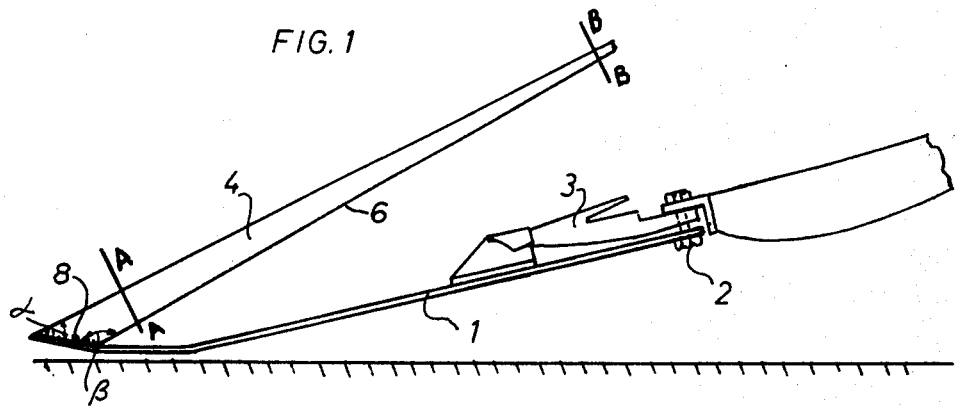

United States Patent [19]

Schumacher, II et al.

[11] 3,965,659

[45] June 29, 1976

[54] GRAIN LIFTER FOR A CORN REAPING MACHINE

[76] Inventors: Gustav Schumacher, II; Guenter Schumacher, both of 5231 Eichelhardt, Germany

[22] Filed: May 16, 1974

[21] Appl. No.: 470,571

[30] Foreign Application Priority Data
May 22, 1973 Germany............................ 2325916

[52] U.S. Cl. ................................................ 56/313
[51] Int. Cl.² ................................................ A01D 65/02
[58] Field of Search ............ 56/313, 314, 318, 319, 56/320, 312

[56] References Cited
UNITED STATES PATENTS
756,114   3/1904   Herman .............................. 56/313
3,579,967   5/1971   Schumacher ....................... 56/313

FOREIGN PATENTS OR APPLICATIONS
120,188   10/1927   Switzerland.......................... 56/318

Primary Examiner—Louis G. Mancene
Assistant Examiner—J. N. Eskovitz
Attorney, Agent, or Firm—Steinberg & Blake

[57] ABSTRACT

A grain lifter for a corn reaping machine comprising a supporting rod to be fixed on the reaper pointing in the direction of motion as well as a lifting bar upwardly and backwardly sloping from the tip of said supporting rod, which has a shape conically tapering from its fastening point on said supporting rod and consisting of a profiled portion which preferably having a U-shaped cross secton with the legs down.

5 Claims, 4 Drawing Figures

U.S. Patent June 29, 1976 3,965,659

GRAIN LIFTER FOR A CORN REAPING MACHINE

The invention relates to a grain lifter for a corn reaping machine comprising a supporting rod to be fixed on the reaper and, as a rule, on the cutter finger and pointing into the direction of motion, as well as a lifting bar upwardly and backwardly sloping from the tip of the supporting rod.

A grain lifter of the kind described will glide, with the front portion of the supporting rod which is frequently of a somewhat angle-shaped form, above the surface and lift, with its lifting bar, the spike ears from the surface so that they cannot get to the cutters and be cut away from the stalks.

Grain lifters of the sort described have already been known in numerous modifications. The lifting bar, also called stalk lifting bar, consists usually of a thin-walled tube welded to the tip of the supporting rod (also called supporting arm).

In another prior art embodiment, the lifting bar consists of a profiled portion having a U-shaped cross section welded, with its legs down, to the tip of the supporting rod.

These prior art embodiments however show various disadvantages. In the first-mentioned modification, dust and moisture will frequently be conveyed into the interior of the lifting bar accumulating at the lower end where the lifting bar is welded to the supporting arm. Within a very short time, heavy corrosion will occur which will lead, within a relatively short time, to fracture of the thin-walled tube due to the rust.

A further disadvantage which is common to the two prior art embodiments is seen in that the grain lifter, and particularly the lifting bar is oscillating with its free end because of the vibrations caused by the reaper or the harvester connected to it. These vibrations can be so strong that the lifting bar will break at the welding seam.

Apart from the fact that a grain lifter having a broken lifting bar cannot fulfill its function, the broken lifting bar tube constitutes a great danger to the reaper of the harvester. If it gets into the reaper which, as a rule, is always the case, this will lead to heavy damage of the cutter knife or of the cutter fingers, respectively. As a consequence, the machine will be out of order for a certain length of time because the damaged blades of the cutter knives, or the damaged cutter fingers, respectively, must be exchanged.

It is now the aim of the present invention to avoid the aforementioned disadvantages and to provide a grain lifter wherein the lifting bar, because of its particular construction, is no longer subject to dangerous oscillations and wherein fastening to the supporting rod is so provided that break-off of the lifting bar and dangers to the cutters connected therewith are avoided.

In accordance with the invention, the problem is solved in that the lifting bar has a shape conically tapering from its fastening point on the supporting rod.

In such an embodiment, the weight of the lifting bar is reduced towards the free end thereof, and it has shown that such lifting bar will no longer oscillate in response to the vibrations of the reaper or the harvester connected therewith, respectively, so that the danger of a break-off has widely been eliminated.

In accordance with a particularly advantageous modification of the present invention, the lifting bar consists of a profiled portion having a U-shaped cross section with the legs down, the lengths of which growing shorter towards the free end of the lifting bar.

In addition to the small susceptibility to vibration, a grain lifter of the sort described shows the further advantage that dust and humidity cannot accumulate in the vicinity of the welding seam so that the danger of corrosion is widely avoided as well.

Moreover, the legs of the U-shaped profile portion which are elongated at the point of connection permit a considerably more stable welding connection.

In accordance with a further advantageous modification of the present invention, the lifting bar consists of a profile section having a U-shaped cross section, with the legs shown downwardly, wherein the distance between the legs of said U-shaped profile becomes narrower towards the free end of the lifting bar. In this modification, too, the weight of the lifting bar is reduced towards the free end so that dangerous vibrations are avoided.

In accordance with a still further advantageous modification of the invention, the distance between the legs as well as the length of the legs of the U-shaped profile portion become narrower towards the free end of the lifting bar.

It has, finally, shown to be of particular advantage if the legs of the U-shaped profile portion are provided with an angular bent, directed towards each other, so that sharp edges are avoided along the lifting bar.

In all the aforementioned grain lifter modifications of the invention, the crop will glide along essentially smoother than in the prior art embodiments, as it will not be retained thanks to the constantly narrowing cross section of the lifting bar. The free end of the lifting bar can moreover be made so light that it will not constitute a danger to the reaper even if it should get into it.

Figure 3:
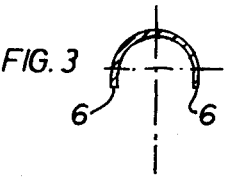
Figure 4:

The present invention will now be described in detail in connection with the exemplified embodiments shown in the attached drawings, wherein FIG. 1 shows a lateral view of a grain lifter of the invention fastened to the cutter finger of a reaper, FIG. 2 constitutes a cross section of the lifting bar of the grain lifter according to FIG. 1 along the line A — A, FIG. 3 constitutes a cross section of the lifting bar according to FIG. 1 along the line B — B, and FIG. 4 shows a cross section through a further modification of the grain lifter according to the invention along the line A — A of FIG. 1.

The grain lifter shown in FIG. 1 is connected, via its supporting rod 1, to cutter finger fastening bolt 2 and to cutter finger 3 of the reaper.

Lifting bar 4 is welded to the front end of supporting rod 1. As can be taken from the cross sections shown in FIGS. 2 and 3, it consists of a U-shaped profile portion having, at its welded end, relatively long legs permitting a good welding connection while said legs grow shorter towards the free end of the lifting bar (compare FIG. 3).

In the modification shown in FIG. 4, the legs of the U-shaped profiled portion each have, at their ends, a bent directed towards each other.

It will thus be seen that a harvester equipped with the structure of the invention has the stalk-lifting bar welded only to the front tip region of the elongated rod 1, which is connected only at its rear end region to the harvester or reaper. The stalk-lifting bar of the invention is made of a sheet material and has a pair of opposed side walls which become gradually narrower in an upward direction, as is apparent from a comparison of FIGS. 2 and 3 as well as from FIG. 1. These opposed side walls have rear free edges while they are interconnected by the substantially U-shaped front portion of the sheet material giving the lifter the U-shaped cross section shown in the drawings. The bottom edge of the bar 4 of the invention is situated in a plane which makes an acute angle with the front portion of the bar and an obtuse angle with the free rear edges of the side walls, so that the upwardly and rearwardly inclined bar has a relatively large dimension at its bottom edge affording a secure welded connection with the front region of the rod 1. Because the free rear edges of the side walls of the bar 4 are spaced from each other the entire interior of the bar of the invention is open to the outer atmosphere preventing any moisture from collecting in the interior of the bar and thus preventing corrosion which might take place from accumulation of moisture.

Figure 2:
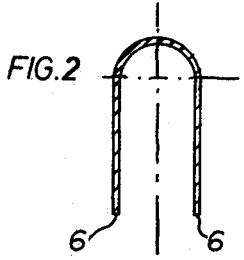

Moreover, as is particularly apparent from a comparison of FIGS. 2 and 3, while the opposed side walls of the bar 4 have a substantial length at the region of the lower end thereof, the length of these opposed side walls becomes so short toward the upper rear end of the bar that these side walls practically disappear and at its upper rear end the bar of the invention has in cross section substantially the configuration of a semi-circle.

Referring to FIGS. 1–3, it will be seen that the free rear edges 6 of the side walls of the bar 4 are indicated, the comparison of FIGS. 2 and 3 as well as the illustration in FIG. 1 showing how the bar 4 tapers upwardly and rearwardly from its bottom edge 8 which is welded only to the front tip region of the rod 1. Because this bottom edge 8 is situated in a plane which makes an acute angle $\alpha$ with the forwardmost edge of the front wall of the bar 4 and an obtuse angle $\beta$ with the free rear edges 6, the bar 4 has at its bottom edge 8 a relatively large dimension affording a secure welded connection with the front tip region of the rod 1.

We claim:

1. In a reaping machine, an elongated supporting rod having an upper rear end region to be fixed on the reaper so that the supporting rod points forwardly and downwardly in the direction of motion, said supporting rod having a front tip region distant from and lower than said rear end region thereof, a lifting bar having a lower end welded only to said front tip region of said supporting rod and being inclined upwardly and backwardly from the front tip region of said supporting rod, said lifting bar gradually tapering and becoming narrower from its lower end upwardly toward an upper rear end region of said bar, said lifting bar being made of a metallic sheet material and having a pair of opposed side walls terminating in free rear edges and a substantially U-shaped front wall interconnecting said side walls, said side walls having a width which is of a maximum dimension at the lower end of said bar and which becomes gradually smaller toward the upper rear end region of the bar while said bar has a lower end which is welded to said front tip region of said rod, said lower end being situated in a plane which makes an acute angle with a forwardmost edge of said front wall and an obtuse angle with the rear free edge of said side wall to afford a secure welded connection of the bar to the front tip region of said rod, said rod having an upper surface situated in said plane.

2. The combination of claim 1 and wherein the width of said side walls gradually diminishes from the lower end to the upper end region of said bar to such an extent that said side walls practically disappear at the upper end region of said bar.

3. The combination of claim 2 and wherein said bar has at its upper end region a substantially semicircular cross-sectional configuration.

4. The combination according to claim 1, the distance between said side walls of said lifting bar becoming smaller towards the upper free end thereof.

5. The combination according to claim 1 wherein said rear edges of said side walls are bent inwardly towards each other, so that a stalk or the like will not be cut by said rear free edges of said side walls.

* * * * *